July 13, 1965  M. LANGE  3,194,881

ENGRAVING APPARATUS

Filed Nov. 25, 1960  3 Sheets-Sheet 1

July 13, 1965  M. LANGE  3,194,881
ENGRAVING APPARATUS
Filed Nov. 25, 1960  3 Sheets-Sheet 2

United States Patent Office 3,194,881
Patented July 13, 1965

3,194,881
ENGRAVING APPARATUS
Maurice Lange, Issy-les-Moulineaux, France, assignor to Societe Anonyme dite: Ancienne Maison Turquetil, a French company
Filed Nov. 25, 1960, Ser. No. 71,573
Claims priority, application France, Nov. 30, 1959, 842,302
5 Claims. (Cl. 128—6.6)

This invention relates to automatic engraving apparatus using photo-electric scanning arrangements. Broadly, apparatus of the class to which the invention relates serves to produce an engraved pattern upon a work surface, in accordance with a master pattern, and comprises a photo-electric scanner device scanning the master pattern and producing an electric output varying in accordance with the light and dark areas in said master pattern, and a cutter tool device scanning the work surface in substantial synchronism with the scanning of the master pattern and including a cutter tool revolving at high speed and axially displaceable to an extended working position and to a retracted idle position under control of the electrical output of the scanning device, thereby to produce on the work an engraved pattern substantially similar to the master pattern.

It will be understood that such apparatus is applicable both to engraving processes of the intaglio type, as used for example in incised and photo-engraving work, and to processes working in relief, as in letter-cutting, half-tone work and the like. In the former class of applications, the cutter tool would normally be in retracted position in all areas corresponding to blank or light areas of the master pattern, and would be advanced to working position in only the dark areas of the master pattern; in the second aforementioned class of processes, the reverse is true, the cutter tool being retracted to its idle position out of engagement with the work surface in only those areas that correspond to dark (e.g. printed) areas of the master pattern.

It is a first object of this invention to correct a difficulty that is encountered in engraving processes of the general type specified, due to the non-negligible lateral dimension, or radius, of the cutter tool. That is, for reasons that will more clearly appear presently, considering for example the operation of the apparatus when working in relief or half-tone operation, the finite radial dimension of the cutter tool results in all the outstanding areas of the engraved pattern being somewhat smaller in lateral extent than are the corresponding dark areas of the master pattern they are supposed to reproduce; similarly in intaglio work, the outstanding areas of the engraved pattern are all somewhat greater in extent than are the corresponding blank or light areas of the master pattern, and in either case the dimensional error thus introduced increases as the cutting depth of the tool increases. This has set a limit to the usable depth of cut, or has necessitated the use of complicated means for compensating the afore-mentioned error. It is hence an object of this invention to compensate for such dimensional error due to finite cutting tool radius in a wholly satisfactory manner and by the employment of very simple means, thereby permitting the use of substantially greater cutting depths while still producing engraved patterns which are substantially identical, dimensionally, with the master pattern.

Another object of the invention is to provide an improved construction of the cutting tool device. In conventional constructions, the cutter tool is provided at the end of a spindle mounted for high speed rotation and for axial displacement between its retracted and advanced positions. Axial movement between these positions is obtained by electromagnetic means, operated by the output from the photo-cell of the scanning device. In one conventional construction, such electromagnetic means comprises a pair of bar magnets axially displaceable with (but not rotatable with) the cutter spindle, and a pair of electromagnets respectively cooperating with said bar magnets and selectively energizable by the photo-cell output so as to cooperate with one or the other of the bar magnets to shift the cutter spindle to its retracted or its advanced position respectively. This double-acting arrangement is advantageous in that each of the electromagnets is able to exert its full power to retain the cutter in its advanced, or retracted, position without having to overcome any biassing action, such as that of a spring; however, it has a drawback in that only one of the two bar magnets axially shiftable with the spindle is actually serving a useful purpose at any time, i.e. in either one of the two positions, while the other bar magnet then constitutes a dead weight which unnecessarily increases the total weight of the shiftable assembly and the power required to displace it between its two positions. It is a further object of this invention to provide an improved engraving cutter tool assembly in which the electromagnetic operating structure is so arranged that all of its electromagnetic components perform a useful function in every condition or phase of the operation of the assembly, thereby increasing the response rate and operating efficiency for a given size and weight.

Further objects and features of the invention will become apparent from the following description given by way of illustration but not of limitation with reference to the accompanying drawings wherein.

Figure 1:
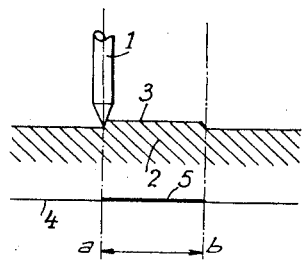
FIGURES 1, 2 and 3 are diagrammatic views serving to illustrate the dimensional error introduced into a photo-electric engraving process due to the non-negligible radial dimension of a cutter tool.
Figure 2:
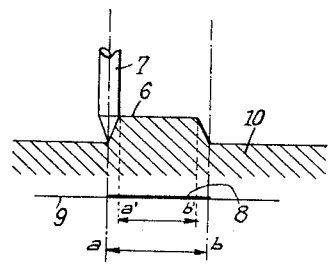
Figure 3:
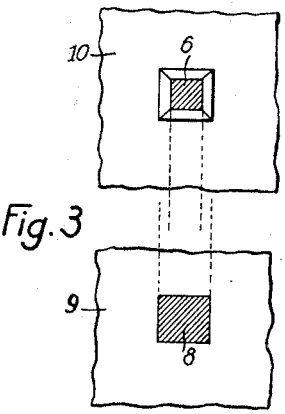

The afore-mentioned dimensional error encountered in conventional photo-electric engraving apparatus will now be further explained with particular reference to FIGURES 1 to 3.

In FIGURE 1, there is schematically shown a revolving cutter tool 1 engaging the generally flat surface of a workpiece 2, which may be made of wood, metal, or other material. The tool 1 is axially displaceable between the advanced working position in which it engages the work, as shown, and a retracted or idle position, such displacement being produced e.g. electromagnetically in response to the magnitude of the electrical output signal from an electro-magnetic scanner device as will be later described. A master pattern, e.g. a printed sheet, is shown edgewise at 4. The master pattern sheet 4 may be assumed to be white in its blank areas, and dark in its printed areas, such as the dark band indicated at 5. In the scanning of this matter pattern by the photoelectric scanner (not shown in this figure), the scanner output has a maximum magnitude, in the blank or light areas of the sheet 4, and a minimum or null, output in the dark areas such as 5. As the tool 1 is displaced across the work 2 horizontally as shown in the drawing, in synchronism with the displacement of the photoelectric scanner across master pattern 4, the tool 1 is advanced to its cutting position (shown) whenever the scanner output is high, and is retracted out of engagement with the work surface when the scanner output is low, so that an area in relief, such as 3, is provided on the work surface to correspond with each dark area such as 5 in the master pattern. In FIGURE 1, the cutting depth of the tool 1 in its working position is shown to be comparatively shallow, and in these circumstances it will be evident that the lateral (here horizontal) dimension of the outstanding area 3 very closely approximates the extent $ab$ of the corresponding dark area 5 of the pattern sheet. It is generally desirable, however, to use a substantially greater cutting depth, as shown in FIGURE 2; under these conditions, it will be evident that due to the non negligible radial dimension of the cutter tool 7, the dimension ($a'b'$) of an outstanding area such as 6 is substantially smaller than the corresponding dimension $ab$ of the corresponding dark area 8 of the master pattern 9, such error being increasingly great as the cutting depth used is greater. In the plan views of FIGURE 3, it is seen that a dark square 8 present on the master pattern sheet 9 will be reproduced on the work surface 10 as a frustum of a square pyramid in which the top surface 6 is a smaller square than the corresponding square 8 to be reproduced. Since in the subsequent printing process in which the engraved pattern serves as a printing pattern only the upper surfaces such as 6 are inked or otherwise coated for transfer of the ink to a print surface, it will be apparent that the dimensions of the original master pattern will not be accurately reproduced on the print.

Assuming for example that the square 8 on the master pattern has a side of 10 mm., and that the radius of the cutter tool 7 is 1 mm., the square such as 6 produced on the engraved pattern, and the subsequent prints obtained therefrom, will have only 8 mm. to a side.

Figure 4:
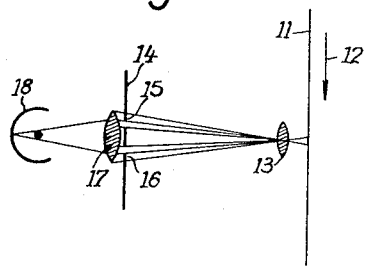
FIGURE 4 is a diagrammatic view of an improved photo-electric scanning arrangement in accordance with the present invention, serving to eliminate the error illustrated in the preceding figures.
Figure 5:
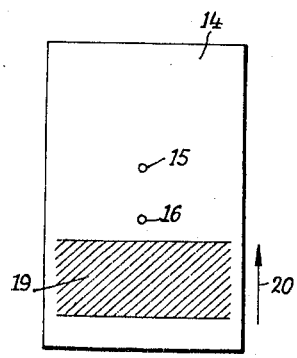
FIGURE 5 is a front view of the diaphragm screen of the system of FIGURE 4, formed with two spaced orifices in accordance with the invention.
Figure 7:
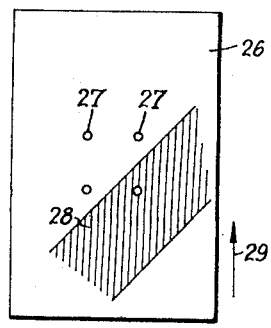
FIGURE 7 is a view similar to FIGURE 5 illustrating a modified diaphragm screen according to the invention.

To overcome this defect, the invention provides a photoelectric scanning system of improved type diagrammatically shown in FIGURE 4. In this figure, numeral 11 designates the master pattern sheet, which is displaced in the direction of arrow 12 relative to the scanning system. This latter system includes an object lens 13 which projects upon a diaphragm screen 14 a magnified image of a small portion of the pattern surface being scanned, conventional illuminating means, not shown, being provided for illuminating said surface by transparency or reflection as desired. In accordance with the invention, diaphragm screen 14 is formed with two spaced orifices 15 and 16 displaced in the general direction of scanning. Beyond the screen, the light passing through said orifices focussed by a lens 17 upon the sensitive element of a photoelectric cell 18. The output from this cell is an electric voltage which is variable with the amount of light reaching the cell. The output voltage is applied to the input 110 of a reverser relay to be later described, serving to actuate the cutter tool axially between its working and retracted positions. Assume that the master pattern sheet 11 to be reproduced by the engraving process bears a dark printed area, which is projected on the screen 14 as the dark band 19 shown in FIGURE 5. As the sheet travels past the scanner lens 13 as shown by the arrow 12 in FIGURE 4, the band 19 moves upwards as indicated by the arrow 20 of FIGURE 5.

Figure 6:
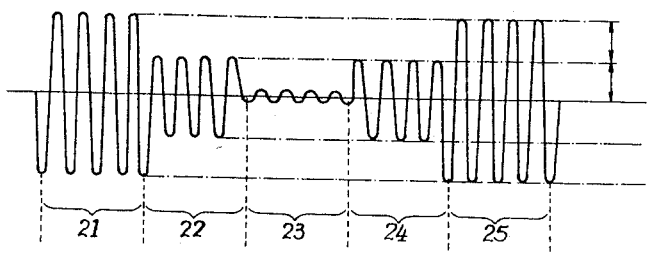
FIGURE 6 is a waveform graph illustrating the manner in which the electric output voltage from the photo-electric scanner device of the invention changes between three different magnitudes in accordance with the number of orifices that are obscured by a dark area of the pattern at any time during the scanning.

Referring to FIGURE 6, this shows the variations of the electrical output current or voltage from photocell 18 during the scanning of the master pattern sheet. As long as the band 19 covers neither of the orifices 15 and 16 the cell output is a maximum as indicated in the region 21 of FIGURE 6. Eventually the leading edge of the band 19 moves past the lower orifice 16. The photocell now receives light through orifice 15 only, and its output drops to a lower value, as shown in region 22 of the graph of FIGURE 6. As the dark band advances it reaches the orifice 15 and assuming the band is broad enough at this time both orifices 15 and 16 are simultaneously obscured, and the photocell delivers zero or minimum output, as shown in region 23 of the graph. As the upward motion of the band proceeds further, the lower orifice 16 is first unmasked, increasing the photocell output to the intermediate value, region 24; finally when the band has moved completely past the upper orifice 15, the normal maximum output is restored, as shown in region 25.

The provision of the two-orifice screen according to the invention provides a means of controlling the operation of the cutter tool in such a manner as to permit compensation for the error due to finite tool radius. Thus, assuming the invention is applied to an engraving process in which the dark areas of the master pattern are to stand out in relief, the operation would be as follows. Wherever the photocell 18 is delivering full output, as in the sections 21, 25 of the graph of FIGURE 6, such output actuates a conventional reverser relay to a first one of its two positions in which the relay energizes electromagnetic means associated with the tool so as to shift the cutter tool to an advanced position, i.e. project the tool into the work. Thus at such periods the tool would cut into the surface of the work. The relay is so adjusted that it drops back to its other circuit position when the relay input from the cell falls to its intermediate valve as in sections 22, 24 of FIGURE 6; at such times the electromagnetic means acts to retract the tool from the work. It will be apparent that in this way the width of the area that is left uncut by the tool can be made greater than if the reversing action of the relay occurred at the instant the cell output would drop to its zero or minimum value, as would be the case if only a single diaphragm orifice were provided in screen 14, since there would then be no intermediate zone or "twilight zone" (such as the zones 22 and 24 in FIGURE 6) as is obtained in the apparatus of the invention whenever only one of the two orifices is obscured.

Similarly, if the apparatus of the invention is applied to an intaglio engraving process in which the work areas corresponding to printed areas of the pattern sheet are to be recessed, then the relay would be adjusted so that its reversal would occur when the photocell output delivered to it changes from the intermediate to the lower or zero level, i.e. from region 22 to region 23 of FIGURE 6, and back from region 23 to region 24. The result will be that the uncut areas on the work will then be narrower than would be the case with a single diaphragm orifice, thus again compensating for the tool radius error.

In cases where the printed or other pattern to be reproduced includes dark lines differing substantially in their angular position with respect to the sides of the sheet, the provision of orifices such as 15 and 16 spaced along a single direction on the screen may not permit achieving accurate compensation. To overcome this, spaced orifices may be provided in the screen along more than one direction, e.g. the four orifices 27 spaced in pairs in two mutually normal directions on the screen 26, and thus forming a square. Such an arrangement will provide for substantial compensation even for angular positions of a band 28 which approach a direction normal to the scanning direction indicated at 29. It will be understood that the number, spacing and disposition of the spaced orifices of the invention may vary considerably depending on the particular results desired. Thus there may be provided different spacings along the two main dimensions of the diaphragm to achieve greater compensation in one direction than in the other.

An improved construction of a cutter tool device will now be described with reference to FIGURES 8 and 9.

Figure 8:
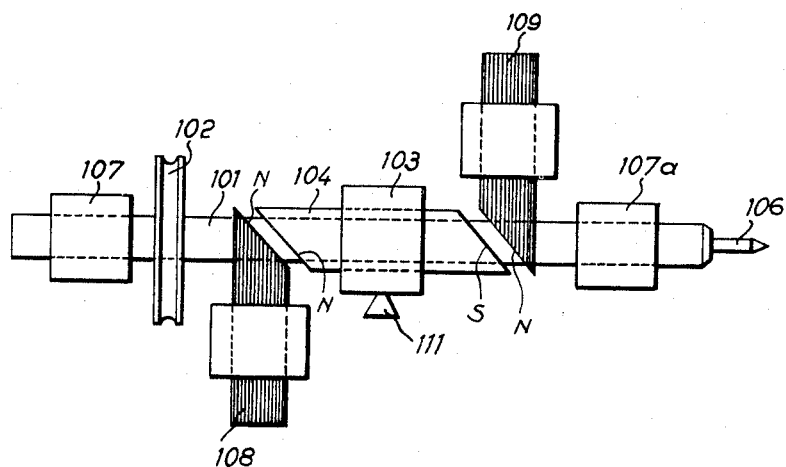
FIGURES 8 and 9 are an elevational and a plan view, respectively, of a cutter device provided with improved electromagnetic actuating means according to an important feature of the invention.
Figure 9:
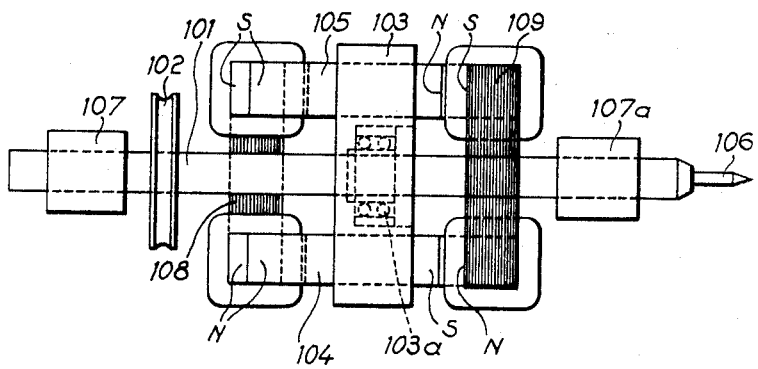

The cutter tool device for engraving apparatus, illustrated in FIGURES 8 and 9, comprises a cutter tool 106 carried at the end of a spindle 101 journalled for high-speed rotation in bearing posts 107, 107a, the spindle being axially shiftable in its bearings for moving the tool between its idle and work positions as will presently appear. The spindle 101 may be rotated from the output of any suitable power means, e.g. through a drive pulley 102 as shown.

A bracket arm 103 is supported by way of ball bearings 103a around a mid-section of cutter spindle 101, so that the bracket does not participate in the rotation of the spindle, and stop means such as 111, fixed to the frame of the apparatus not shown, is provided for preventing rotation of bracket 103 with the spindle. However, the bracket 103 participates in any axial shifting displacements imparted to spindle 103 in its bearings, and for this purpose suitable abutting surfaces, shown dotted, are provided between the spindle and bracket. Fixedly received in apertures formed in the bracket 103 on opposite sides of the spindle and generally parallel thereto, are respective permanent bar magnets 104 and 105, having their north and south poles in inverted relation with each other. As shown, the magnet 104 has its N pole on the left and its S pole on the right, whereas magnet 105 has its N pole right and its S pole left.

A pair of electromagnets 108 and 109 having U-shaped armatures are supported from the apparatus frame, through means not shown, in such positions that electromagnet 108 has its N and S poles respectively spaced a small distance from the N and S poles of the respective bar magnets 104 and 105, while electromagnet 109 has its N and S poles respectively spaced a short distance from the S and N poles of the respective bar magnets 104 and 105. In other words, the arrangement is such that upon energization of both electromagnets 108 and 109 the electromagnets combine their action simultaneously to repel and attract both the bar magnets 104 and 105 so as to impart a rightward displacement to the bar magnets, and thereby to the entire shiftable structure including said bar magnets, bracket 103 and cutter spindle 101–106. Such rightward shift of the cutter tool moves the cutter tool into its working position relative to the work. As presently described in detail, the common energizing circuit for both electromagnets 108 and 109 is switchable to a reverse condition in which the aforementioned energizing actions are reversed, whereupon both electromagnets would combine to shift the cutter tool leftward, i.e. to an idle position relative to the work surface.

Preferably, as shown, the end faces of the bar magnets 104, 105 are cut at bevel angles of 45° in parallel planes, and the cooperating end faces of the electromagnet armatures 108, 109 are cut at corresponding angles, and said electromagnets are supported in the positions clearly shown in FIGURE 8, i.e. so as to extend respectively downward and upward from the general horizontal plane of the cutter spindle.

Stop means, not shown, are provided for positively limiting the axial displacement of the shiftable structure 101–103–104–105 to prevent the end faces of the bar magnets 104, 105 from engaging the electromagnet pole faces in their end shifted positions. Conventional adjusting means are also provided for adjusting the minimum airgap values between the pairs of cooperating pole faces in said end positions. Also, further adjusting means may be provided for adjustably displacing the electromagnets 108 and 109 in the axial direction for controlling the amount of cutter tool displacement.

Figure 10:
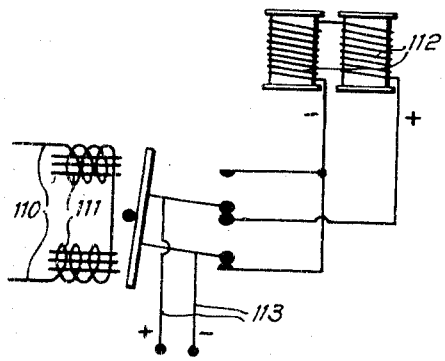
FIGURE 10 is a schematic view of a reverser relay circuit usable with the scanner device of FIGURE 4 for operating the cutter tool device of FIGURES 8–9.

FIGURE 10 illustrates an exemplary circuit for the reversible energization of electromagnets 108 and 109. The circuit includes a conventional two-winding reverser relay diagrammatically shown at 111, and having its input leads 110 connected with the output of the photoelectric cell scanner circuit, forming part of a photoelectric scanner device of the type shown in FIGURE 4 and earlier referred to.

Relay 111 includes a rocking vane armature which actuates a set of reverser contacts as shown. The electromagnet windings 112 in FIGURE 10 schematically represent the windings of electromagnets 108, 109, of FIGURES 8 and 9. The vane armature may be normally biassed to one of its two positions, through means not shown, in which position the input to electromagnetic windings 112 has one of its terminals connected to the plus terminal of a D.-C. source 113 and its other terminal connected to the minus terminal of the source. On actuation of reverser relay 111, as the photocell output applied to relay input 110 exceeds a predetermined threshold value, the vane armature is rocked to its other position in which the relay contacts reverse the connections from the input of electromagnetic windings 112 to the D.-C. source 113, with respect to the normal polarities of said connections.

The general operation of the system described will be evident from the explanations previously given. It should be understood that while the cutter device shown in FIGURES 8 and 9 and the reverser relay of FIGURE 10 are advantageously used in combination with the scanner device of FIGURE 4, the said devices may also have utility independently of one another.

What is claimed is:

I claim:

1. Apparatus for producing an engraved pattern on a work surface in accordance with a master pattern, comprising photo-electric scanner means for scanning the master pattern and producing an electric output varying in accordance with light and dark areas on said master pattern, and cutting means scanning said work surface in substantial synchronism with the scanning of the master pattern and including a cutter tool operable between a working position and a retracted position under control of said output to perform an engraving operation on said work surface, said scanner means comprising a photoelectric cell element for producing said output, an optical system for directing light to the master pattern from which the light is selectively reflected by the light and dark areas towards said photo-electric cell element, a diaphragm screen between the photo-electric cell element and the master pattern for blocking reflected light to said photo-electric element, said screen being provided with at least a pair of orifices spaced in the scanning direction and through which reflected light is restricted to pass, said photo-electric cell element having at least three levels of output as the scanner means passes between light and dark areas on said pattern, a first level corresponding to the passage of light through all of said orifices from a first of the areas, a second level corresponding to the passage of light through all of said orifices from the other of said areas and an intermediate level corresponding to the passage of light through at least one of said orifices from said first area and passage of light through the other of the orifices from said other area, and means for operating the tool between its said positions as said output varies between two selected levels of output from said photo-electric cell element.

2. Apparatus according to claim 1, wherein said diaphragm screen is further provided with orifices spaced in a direction other than said scanning direction.

3. Apparatus according to claim 1 wherein said cutting means comprises a spindle adapted for high-speed rotation and carrying said cutter tool at an end thereof, said spindle being axially shiftable between an advanced working position and a retracted position, at least one first magnet shiftable with the spindle and having north and south poles displaced parallel to the spindle axis, at least one other magnet cooperating with the first magnet, one of said first and second magnets being an electromagnet and relay means connected to receive said photo-electric output for selectively energizing said electromagnet to operate the tool between its said positions.

4. Apparatus according to claim 1 wherein said cutting means comprises a spindle adapted for high-speed rotation, the cutter tool being supported at the end of the spindle, said spindle being axially shiftable between an advanced working position and a retracted position, a pair of bar magnets supported only for axial shifting displacement with the spindle and extending parallel thereto, a pair of electromagnets having poles positioned with respect to the bar magnet poles so that on energization of the electromagnets in a first sense said electromagnets shift both bar magnets in one direction to shift the cutter tool to its working position and on energization in a sense opposite to the first sense said electromagnets shift both magnets in the other direction to shift the cutter tool to its retracted position, and switch means connected to receive said output from the photo-electric cell element and operable for selectively altering the energization of the electromagnets in accordance with variation of said output between selected levels thereof.

5. A method of controlling a cutter in accordance with a master pattern having light and dark areas thereon to produce an engraved pattern on a work surface, said method comprising illuminating the pattern to produce reflected light varying in intensity according to the light and dark areas on the pattern, scanning the pattern with a light sensitive device to distinguish between the light and dark areas of the pattern, controlling the cutter in accordance with the reflected light received by the light sensitive device for selectively initiating and terminating cutting of the work surface in response to variation of light received by the light sensitive device and restricting the passage of light reflected to said light sensitive device from said pattern to at least two spaced zones in the direction of scanning to produce during passage between said light and dark areas at least one intermediate level of light reflection to said light sensitive device in which level at least one zone permits passage of light from a first of said areas on the pattern while the other zones permit passage of light from the other of the areas on the pattern.

References Cited by the Examiner
UNITED STATES PATENTS

| | | | |
|---|---|---|---|
| 2,141,973 | 12/38 | Finch | 178—69.5 |
| 2,856,459 | 10/58 | Hell | 178—69.5 |
| 2,880,270 | 3/59 | Hell | 178—6.6 |
| 2,880,512 | 4/59 | Fenemore et al. | 33—125 |
| 2,892,887 | 6/59 | Hell | 178—6.6 |

DAVID G. REDINBAUGH, *Primary Examiner.*

ROY LAKE, NEWTON LOVEWELL, *Examiners.*